QUADRANTAL ERROR CORRECTING MEANS FOR MAGNETIC ANTENNAS

Filed Jan. 25, 1954 5 Sheets-Sheet 1

ALFRED A. HEMPHILL
JOHN M. TEWKSBURY
*INVENTORS*

*BY*

Killman and Kerst
ATTORNEYS

ALFRED A. HEMPHILL
JOHN M. TEWKSBURY
*INVENTORS*

*BY*

Killman and Kerst
ATTORNEYS

Sept. 16, 1958 A. A. HEMPHILL ET AL 2,852,776

QUADRANTAL ERROR CORRECTING MEANS FOR MAGNETIC ANTENNAS

Filed Jan. 25, 1954 5 Sheets-Sheet 3

ALFRED A. HEMPHILL
JOHN M. TEWKSBURY
*INVENTORS*

*BY*

Killman and Kerst
ATTORNEYS

Sept. 16, 1958 A. A. HEMPHILL ET AL 2,852,776

QUADRANTAL ERROR CORRECTING MEANS FOR MAGNETIC ANTENNAS

Filed Jan. 25, 1954 5 Sheets-Sheet 4

ALFRED A. HEMPHILL
JOHN M. TEWKSBURY
*INVENTORS*

*BY*

Millman and Kerst
ATTORNEYS

ALFRED A. HEMPHILL
JOHN M. TEWKSBURY
*INVENTOR.*

*BY*

Killman and Kerst
ATTORNEYS

United States Patent Office 2,852,776
Patented Sept. 16, 1958

2,852,776

QUADRANTAL ERROR CORRECTING MEANS FOR MAGNETIC ANTENNAS

Alfred A. Hemphill, Baltimore, and John M. Tewksbury, Lutherville, Md., assignors to Bendix Aviation Corporation, Towson, Md., a corporation of Delaware Application January 25, 1954, Serial No. 406,006
6 Claims. (Cl. 343—788)

This invention relates to antennas of the magnetic type and more particularly to arrangements for compensating flush type magnetic antennas for quadrantal errors.

A magnetic antenna is depicted in Figs. 2, 3 and 4 of U. S. application Serial No. 264,717, now Patent No. 2,740,113, for "Magnetic Antenna Systems" filed January 3, 1952 in the name of Alfred A. Hemphill.

A direction finder system incorporating a magnetic antenna, or any antenna system suitable for the purpose, will indicate the direction of arrival of radio waves at the antenna. This may not be the true direction to the transmitting station because the direction of travel of electromagnetic waves is affected by: (1) refraction, when travelling from one medium to another where the dielectric constants are different; (2) reflection, when encountering conductive material; and (3) an object in the field, where the object has an actual and/or effective permeability different than the medium in which it exists. In aircraft or surface craft installations, the greatest distortion is caused by the effect of the conducting surface of the craft. These errors are described in the book "Wireless Direction Finding" by Keen, published by Iliffe & Sons Ltd., London, England. Since the above mentioned errors change sign in each quadrant they are commonly called "quadrantal" errors.

Two usual provisions for correcting errors of the second type involve the use of fixed or adjustable cams and external correction loops. External correction loops require too much space to permit their use in flush type installations while cam correctors require additional space and power to drive them. Both provisions also substantially increase the cost of the direction finding antenna.

It is an object of this invention to provide a means for compensating for quadrantal errors in flush mounted magnetic antennas by the use of simple and inexpensive structures.

It is a further object to provide such a means which adds very little weight to the antenna installation and does not protrude from the flush mounting.

It is another object to provide such a means which does not require additional power to produce compensation.

These and other objects and advantages are realized by compensating arrangements which change the effective position of one or more of the collector bars.

Referring to the drawings.

Figure 1:
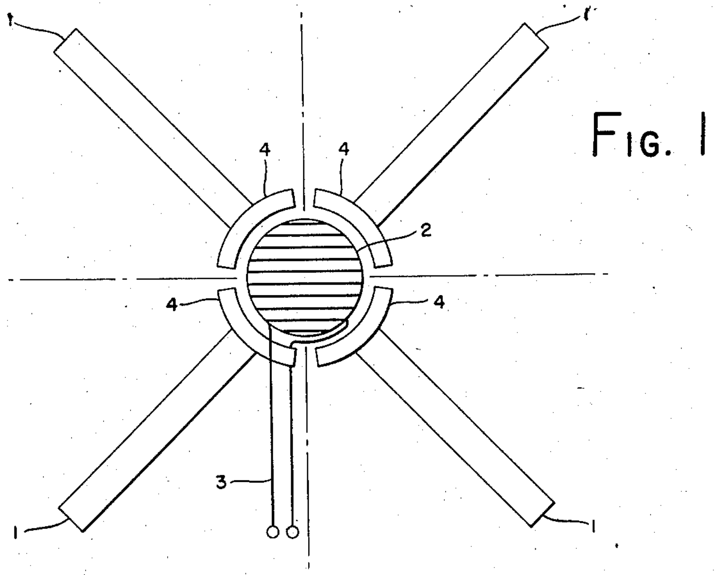
Fig. 1 illustrates a plan view of a typical magnetic antenna.

Referring to Fig. 1, a typical magnetic antenna is shown which consists of collector bars 1, pole pieces 4 and a center pick-up 2 comprising a coil of wire 3. It will be noticed that in the particular antenna illustrated, the center-lines of the collector bars 1, which are at right angles, are coincident with the center-lines of their respective pole pieces 4. This means that the angles at which the magnetic wave front is intercepted by the bars 1 will be the same angles at which the energy will be coupled into the pick-up 2 by the pole pieces 4. Therefore, the field existing in the pick-up 2 will have the same directional orientation as the field existing about the antenna. Because the pick-up 2 is fixed in a particular rotational position, the amount of voltage induced in the wires 3 will be functions of the field strength and of the angle of approach thereto of the magnetic wave.

Figures 2A, 2B, 2C, 2D, 2E:
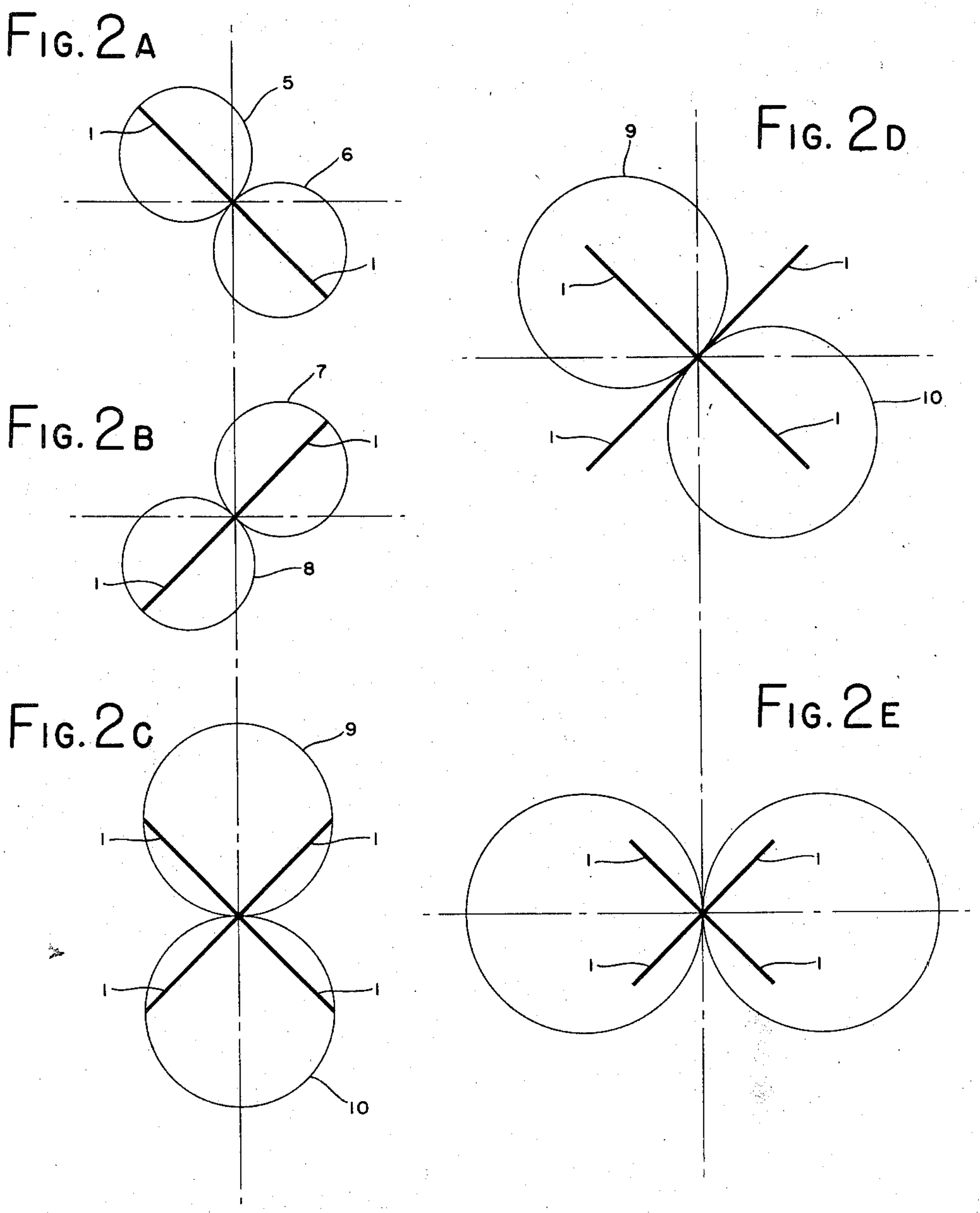
Fig. 2 illustrates sensitivity and directivity patterns of the type of antenna depicted by Fig. 1.

A pattern, consisting of circles 9 and 10, of the signal sensitivity of the antenna illustrated in Fig. 1 is shown in Fig. 2*c*. Although the pick-up 2 is not shown, it is located in the same position as in Fig. 1. Signal sensitivity patterns, consisting of circles 5, 6, 7 and 8, of the individual pairs of the bars 1, are illustrated in Figs. 2*a* and 2*b*. With the alignment of the pick-up 2, as illustrated in Fig. 1, the signals whose sensitivities are represented by the circles 5 and 7, are of similar polarity. The signals whose sensitivities are represented by the circles 6 and 8 are also of similar polarity but are displaced 180° in polarity from the first mentioned signals. When the effects depicted in Figs. 2*a* and 2*b* are added together, the signal sensitivity pattern illustrated in Fig. 2*c* is produced. The polarity of the signal whose sensitivity is represented by the circle 9 is the same as that represented by the circles 5 and 7. Likewise, the signals whose sensitivities are represented by the circles 6, 8 and 10 are of the same polarity. This, therefore is the signal sensitivity pattern of the antenna of Fig. 1 where the pick-up 2 is located as shown. When the pick-up 2 is rotated, the pattern of the sensitivity, as depicted in Fig. 2*c*, is rotated in synchronism therewith. This is illustrated in Fig. 2*d* where the pick-up 2 was rotated 45° counter-clockwise. Consequently, the pattern of the sensitivity of the antenna is a function of the position of the pick-up 2 containing the wire 3.

As the electric and magnetic fields are at right angles to the direction of propagation of the electromagnetic wave, a pattern of the directivity of the antenna will be at right angles to the pattern of the sensitivity thereof. This is illustrated for the sensitivity pattern of Fig. 2*c* by the directivity pattern in Fig. 2*e*.

Figure 3:
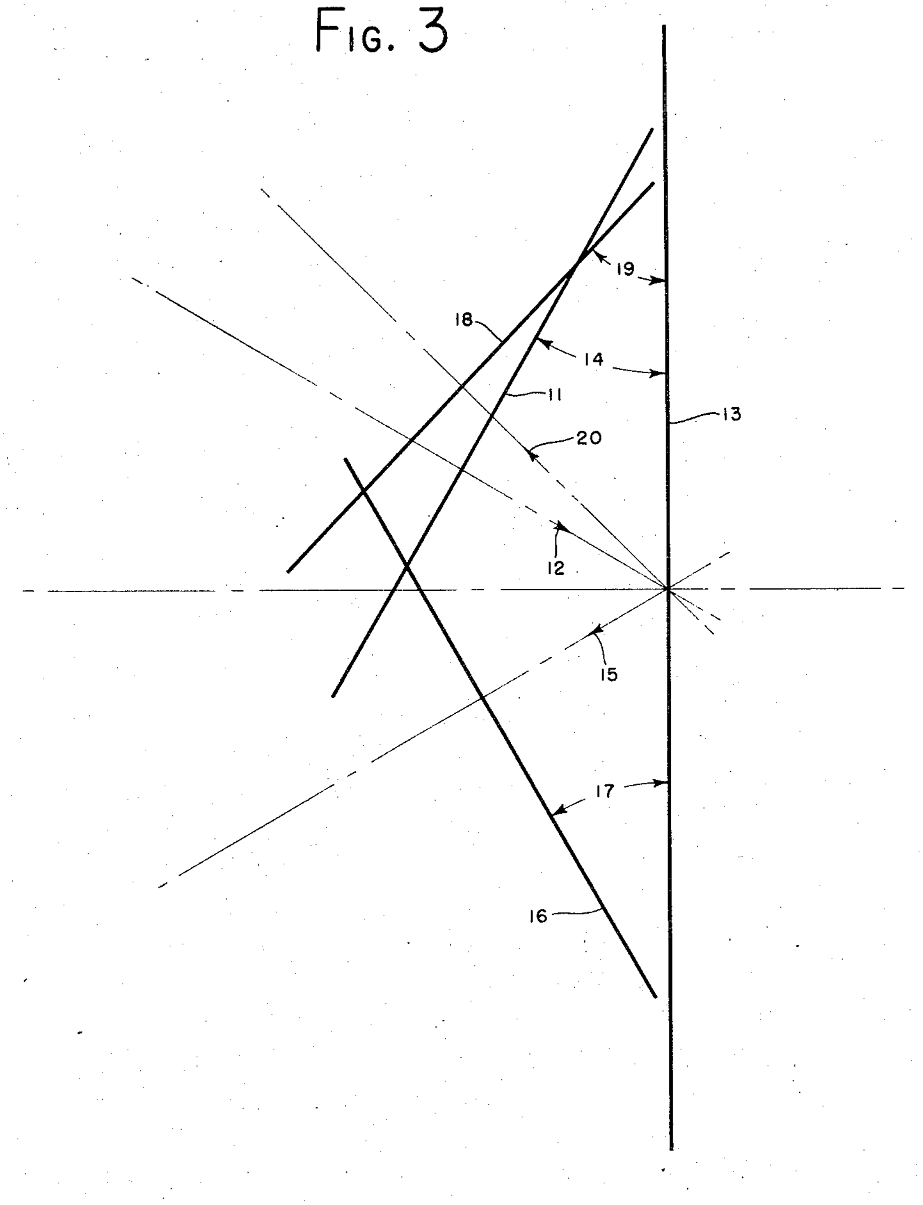
Fig. 3 illustrates wave fronts of electromagnetic waves that are in the vicinity of a conducting surface.

When an electromagnetic wave strikes an object containing a conducting surface, distortions take place within the portion of the electromagnetic field that is in relatively close proximity to the surface. This distortion is caused by a re-radiation of energy from the surface such that the re-radiated field combines with the initial field. Referring to Fig. 3, a line 11 is shown which is parallel to the wave front of an electromagnetic field advancing in a direction indicated by an arrow 12. The line 11 encounters a conducting surface 13 at an angle 14. The energy of this field is partially re-radiated by the conducting surface 13 in a direction indicated by an arrow 15 such that a line 16, which is parallel to the wave front of the re-radiated energy, subtends an angle 17 with the surface 13. The angle 17 is equal to the angle 14. The re-radiated energy will combine with the initial energy to produce a resulting field whose wave front as represented by a line 18 is at an angle 19 with the surface 13. It will be noticed that the resulting field appears to originate from a direction, as indicated by an arrow 20, different than the initial field. It can be proven mathematically and experimentally that the error between the indicated direction and the true direction increases from zero to a maximum and returns to zero as the angle 14 is varied between zero and 90°. The maximum error will occur slightly before the angle 14 is equal to 45° and will depend on the percentage of the energy that is re-radiated.

Figure 4:
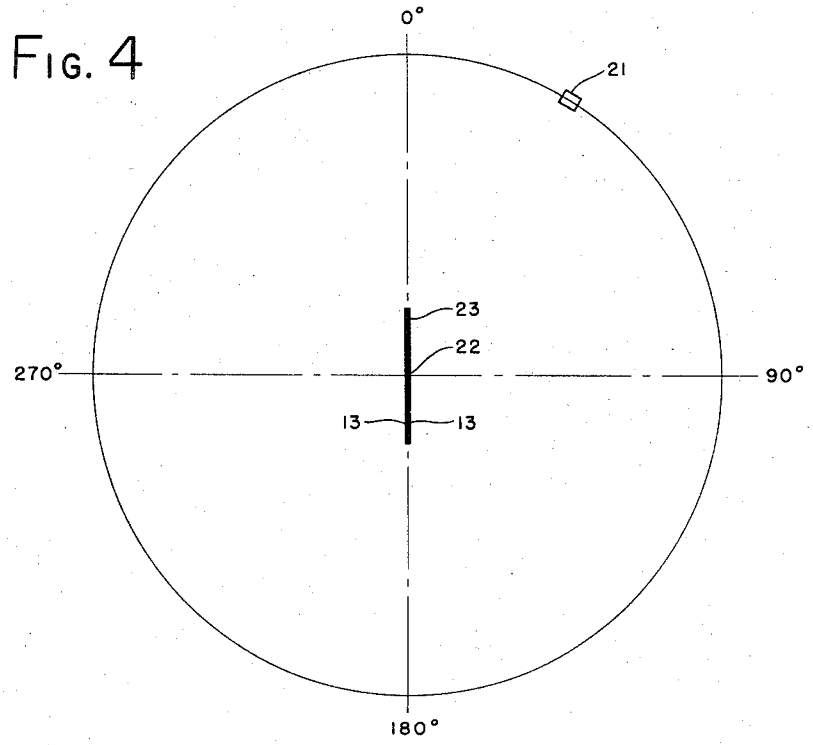
Fig. 4 shows an object about which is revolving a transmitting station.
Figure 5:
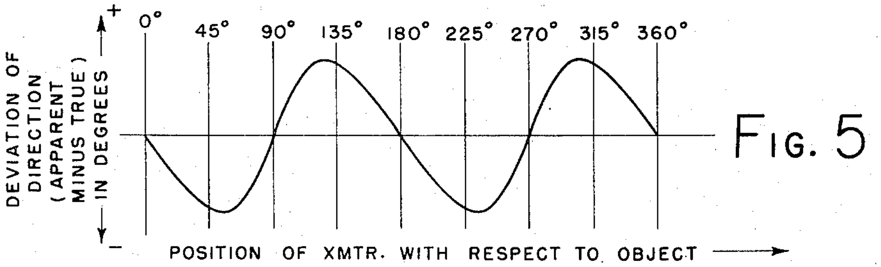
Fig. 5 is a plot of the variation of the error, as viewed from the object, existing between the actual direction and the apparent direcion of the transmitting station in Fig. 4.

Referring to Fig. 4, a top view of an object 23 is shown, whose thickness is relatively small and whose flat sides are relatively large and are conducting surfaces 13. A transmitting station 21 revolves about the object 23. If the error in the electromagnetic field about a point 22 is computed for various positions of the transmitting station 21 as it revolves about the point 22, the deviation plot in Fig. 5 is obtained. This plot approaches a sine wave and reverses polarity for each 90° through which the transmitting station 21 passes.

Although an airplane does not present a flat exterior surface as discussed in the explanation of Figs. 3 through 5, a similar phenomenon occurs and is commonly referred to as quadrantal error. Obviously, quadrantal error will produce incorrect directional indications in the airplane.

The present invention provides means for producing deviations in the opposite sense such as to cancel the quandrantal error in the signal arriving at the indicating means within the airplane.

As discussed supra with respect to Fig. 1, when the center-lines of the collector bars 1 are at right angles and are coincident with the center-lines of their respective pole pieces 4, a field that is in the same direction as the surrounding field is produced in the pick-up 2. If the collector bars 1 are displaced such that their center-lines do not coincide with the center-lines of their respective pole pieces 4, then the intensities of the field as encountered by the bars 1 are not coupled into the pick-up 2 at the proper angles. Therefore, the field produced within the pick-up 2 will be a distortion of the surrounding field.

Figure 6:
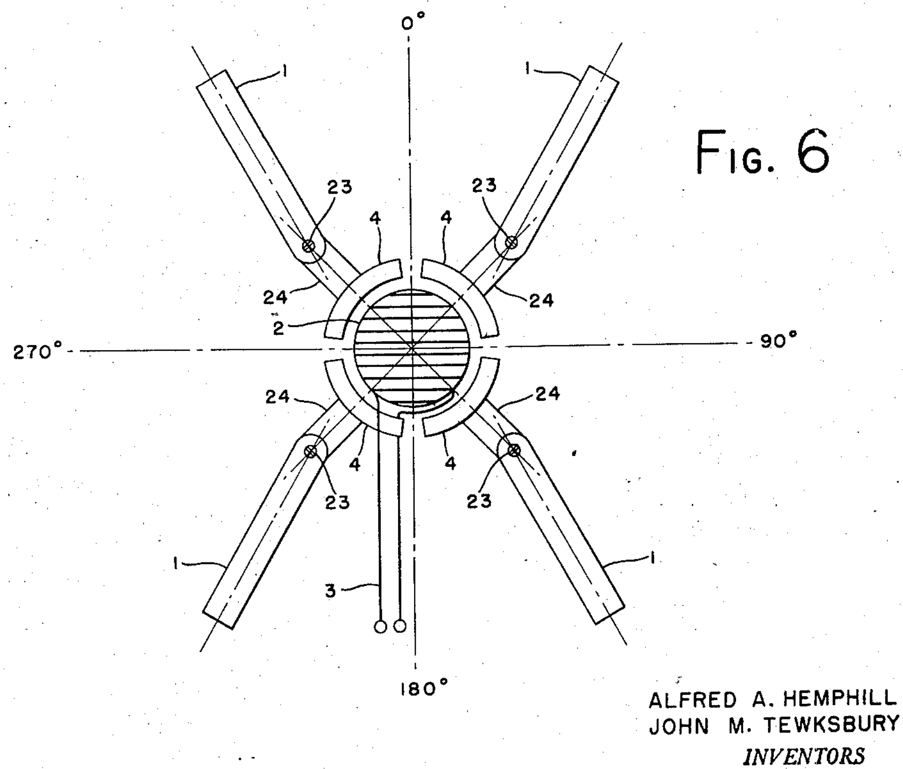
Fig. 6 is a plan view illustrating the incorporation of the invention in the magnetic antenna of Fig. 1.
Figure 7:
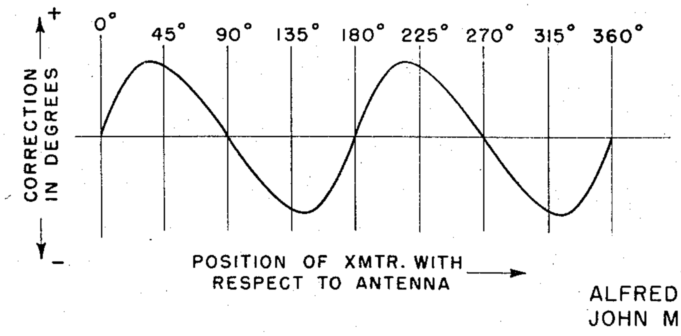
Fig. 7 is a plot of the correcting action of the antenna shown in Fig. 6.

A practical design for producing this result is illustrated in Fig. 6 where the bars 1 may be pivoted about screws 23. The effective angles at which the field is intercepted depend on a number of factors. The primary factors are the relative lengths of the bars 1 and pole piece extensions 24, and the angles existing therebetween. A setting of the bars 1 may be obtained whereby a field is produced in the pick-up 2 which will be in a sense so as to partially compensate for quadrantal error. This is illustrated in Fig. 7 and may be proven mathematically and experimentally. Although perfect compensation is not obtained, sufficient correction is provided to reduce the final error to within allowable limits.

Figure 8:
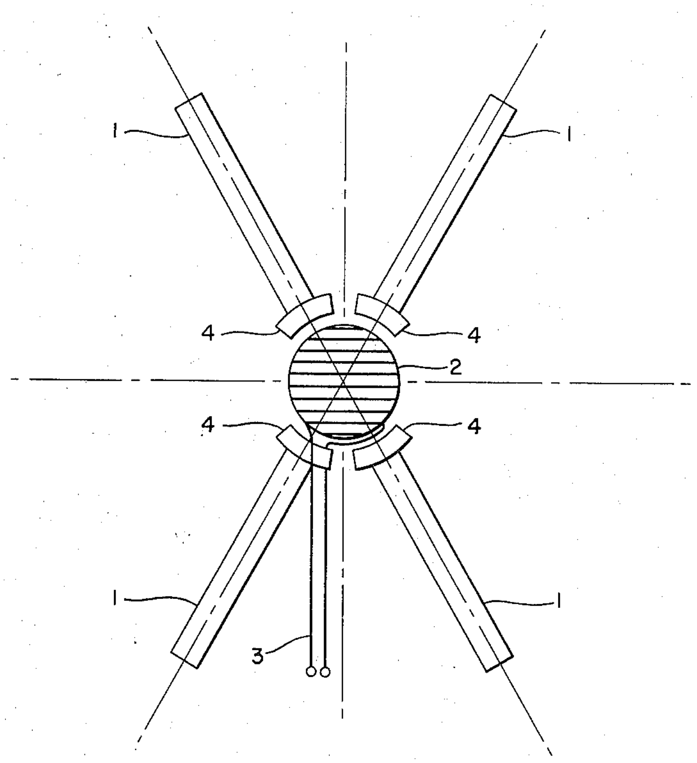
Fig. 8 is a plan view illustrating another variation of the invention in the magnetic antenna of Fig. 1.

Another means for correcting for quadrantal error in the antenna of Fig. 1 is to locate the pole pieces 4 and the bars 1 such that their respective center-lines coincides but are not at right angles. This is illustrated in Fig. 8. The effect produced by this means is slightly different from the effect produced by the means discussed supra, but the compensation is sufficiently close to that desired to reduce the final error to within allowable limits.

Although two means employing the invention have been discussed, it is to be understood that this is not meant to limit the invention since the invention may be embodied in other forms.

What is claimed is:

1. A magnetic antenna comprising: a rotatably mounted high permeability core with a coil wound therearound; a plurality of high permeability pole pieces placed symmetrically about and in close proximity to the said core; a plurality of high permeability antenna elements equal in number to the said first plurality; and means securing one of each of the said elements for pivotal movement about a respective one of the said pole pieces and maintaining therebetween a region of low and substantially constant reluctance throughout the said pivotal movement.

2. A magnetic antenna comprising: a rotatably mounted low reluctance core with a coil wound therearound; a plurality of low reluctance pole pieces placed symmetrically about and in close proximity to the said core; a plurality of low reluctance antenna elements equal in number to the said first plurality; and means securing one of each of the said elements for pivotal movement about a respective one of the said pole pieces and maintaining therebetween a region of low and substantially constant reluctance throughout the said pivotal movement.

3. A magnetic antenna for use in determining the direction of origin of a received signal, comprising: a rotatably mounted high permeability core with a coil wound therearound; a plurality of high permeability pole pieces; a plurality of high permeability antenna elements equal in number to the said first plurality; means securing one of each of the said elements to a respective one of the said pole pieces such that the longitudinal axes of the said elements pass through the center of the said core with the said means maintaining a region of low reluctance therebetween; the angular distribution of said longitudinal axes being such as to introduce into the output of said antenna a distortion pattern which substantially compensates the distortion pattern in said output due to refractions and reflections of a received signal.

4. The method of compensating a magnetic antenna situated in a field distorted by the presence of conducting surfaces, said antenna comprising a highly permeable rotatable core having a coil wound thereon, a plurality of highly permeable pole pieces symmetrically distributed thereabout and in close proximity thereto, and an equal number of highly permeable antenna elements, each extending radially with respect to said core from a respective one of said pole pieces, comprising: rotating said antenna elements about their respective pole pieces, as pivots, by amounts and in directions such that the pattern of sensitivity of said antenna is altered in a manner to produce an output from said antenna in which the effect of the distortion in the said field has been substantially cancelled.

5. The method of compensating a magnetic antenna situated in a field distorted by the presence of conducting surfaces, said antenna comprising a highly permeable rotatable core having a coil wound thereon, a plurality of highly permeable pole pieces symmetrically distributed thereabout and in close proximity thereto, and an equal number of highly permeable antenna elements, each extending radially with respect to said core from a respective one of said pole pieces, comprising: rotating said antenna elements and their respective pole pieces about the said core by amounts and in directions such that the pattern of sensitivity of said antenna is altered in a manner to produce an output from said antenna in which the effect of the distortion in the said field has been substantially cancelled.

6. A magnetic antenna comprising: a rotatably mounted high permeability core with a coil wound therearound; a plurality of high permeability pole pieces placed symmetrically about and in close proximity to the said core; a plurality of high permeability antenna elements; means securing the said elements to the said pole pieces and maintaining therebetween a region of low and substantially constant reluctance; and means arranging the said elements and the said pole pieces with respect to one another to couple magnetic energy from a surrounding magnetic field into the said core in a manner to produce a field in the said core that is dissimilar to the said surrounding field.

References Cited in the file of this patent

UNITED STATES PATENTS 2,718,003 Hemphill et al. -------- Sept. 13, 1955